US006945294B2

(12) United States Patent
Jallais et al.

(10) Patent No.: US 6,945,294 B2
(45) Date of Patent: Sep. 20, 2005

(54) CROWN REINFORCEMENT FOR AN OFF-THE-ROAD TIRE

(75) Inventors: Pierre Jallais, Chamalieres (FR); Jean-Marc Ruffenach, Cebazat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/691,698

(22) Filed: Oct. 24, 2003

(65) Prior Publication Data

US 2004/0089391 A1 May 13, 2004

Related U.S. Application Data

(63) Continuation of application No. PCT/EP02/04710, filed on Apr. 29, 2002.

(30) Foreign Application Priority Data

May 3, 2001 (FR) .............................................. 01 05950

(51) Int. Cl.[7] .............................. B60C 9/18; B60C 9/20
(52) U.S. Cl. ......................... 152/534; 152/526; 152/531
(58) Field of Search ......................... 152/451, 526–529, 152/535–536, 539, 551–552, 554, 556–557, 559, 531, 533, 534, 538

(56) References Cited

U.S. PATENT DOCUMENTS

| 3,589,425 | A | * | 6/1971 | Olagnier ..................... 152/527 |
| 4,067,372 | A | * | 1/1978 | Masson ...................... 152/458 |
| 4,194,548 | A | | 3/1980 | Roger |
| 4,957,799 | A | | 9/1990 | Miyamoto et al. |
| 5,082,042 | A | * | 1/1992 | Kobayashi et al. ......... 152/535 |
| 5,318,643 | A | * | 6/1994 | Mizner et al. .............. 152/527 |
| 5,351,735 | A | | 10/1994 | Okuda |
| 5,365,988 | A | * | 11/1994 | Soderberg et al. .......... 152/527 |
| 5,404,925 | A | * | 4/1995 | Sato et al. .................. 152/534 |
| 5,427,167 | A | * | 6/1995 | Watanabe et al. ........... 152/531 |
| 5,553,646 | A | * | 9/1996 | Ando et al. ............ 152/209.14 |
| 5,688,344 | A | * | 11/1997 | Kobayashi et al. ......... 152/527 |
| 5,743,975 | A | * | 4/1998 | Sinopoli et al. ............ 152/527 |
| 5,958,162 | A | | 9/1999 | Creech |
| 6,237,663 | B1 | * | 5/2001 | Cipparrone et al. ........ 152/527 |
| 6,257,291 | B1 | * | 7/2001 | Boiocchi et al. ............ 152/527 |
| 6,401,778 | B1 | * | 6/2002 | Cluzel ........................ 152/526 |
| 6,401,779 | B1 | * | 6/2002 | Riva et al. .................. 152/527 |
| 6,554,039 | B1 | * | 4/2003 | Riva et al. .................. 152/540 |
| 6,578,611 | B2 | * | 6/2003 | Nakata ................... 152/209.14 |
| 6,598,639 | B2 | * | 7/2003 | Comps et al. .............. 152/526 |
| 6,640,861 | B2 | * | 11/2003 | Pereira et al. .............. 152/532 |
| 6,659,147 | B1 | * | 12/2003 | Cordonnier ................. 152/526 |
| 6,668,889 | B1 | * | 12/2003 | Losey et al. ................ 152/527 |
| 6,708,747 | B1 | * | 3/2004 | Tsuruta et al. .............. 152/526 |

* cited by examiner

*Primary Examiner*—Russell D. Stormer
*Assistant Examiner*—Jason R. Bellinger
(74) *Attorney, Agent, or Firm*—Burns, Doane, Swecker & Mathis, LLP

(57) ABSTRACT

Tire for heavy off-the-road vehicles including a radial carcass reinforcement anchored in each bead to an annular bead reinforcement element, and radially above it a crown reinforcement consisting of at least two working crown plies of inextensible metallic cables crossed from one ply to the next, the said plies having widths at least equal to 50% of the width L of the tread and, radially above these, two protection crown plies of so-termed elastic metallic cables crossed from one ply to the next, the tread including in its ungrooved portion of thickness D at least one armature of reinforcement elements, wherein the said armature is composed of at least two layers of textile monofilaments parallel to one another in each layer, the axial widths of the said two layers being at least equal to the width of the narrower working ply.

4 Claims, 2 Drawing Sheets

CROWN REINFORCEMENT FOR AN OFF-THE-ROAD TIRE

This application is a continuation of International PCT/EP02/04710 filed on Apr. 29, 2002, and which claims priority of Patent Application Ser. No. 01/05950 filed in France on May 3, 2001.

BACKGROUND OF THE INVENTION

The invention concerns a tire with radial carcass reinforcement intended for fitting to heavy building site vehicles and/or off-the-road vehicles such as loaders, trucks, graders or scrapers.

The above tire comprises at least, and mainly, a carcass reinforcement of radial metallic cables and, between the said carcass reinforcement and the tread, a crown reinforcement which comprises mainly an armature, referred to as the working armature, composed of at least two plies of inextensible metallic cables, which are parallel to one another in each ply and crossed from one ply to the next, making angles that may be between 0° and 45° relative to the circumferential direction. The use of machinery fitted with such tires also requires that, radially outside the working plies, there should be an additional armature known as the protection armature, consisting of at least one ply of elastic metallic cables. A cable is said to be elastic if, under a tensile force equal to its breaking load, its relative elongation is at least 3%, while a cable said to be inextensible has a relative elongation at most equal to 0.2% under a tensile force equal to 10% of its breaking load. The cables of the protection ply or plies make angles that may be between 5° and 35° relative to the circumferential direction, and when there are two plies, these are generally crossed over from one ply to the next.

Although initially and as their name implies the primary function of the said protection plies was to protect the working reinforcement against the harsh action of the ground upon the tire, their structural characteristics in contemporary tires result on the one hand in a large contribution towards resistance to separation between the two working plies, while on the other hand, since the life of off-the-road tires is longer, they are insufficient to ensure constant protection during the said life.

A tire of the type considered is subjected by the ground over which it rolls to a great deal of aggression, particularly in the case of heavy loading and transport vehicles. Such aggression by angular, sharp and other objects leads:
  (a) to cuts in the tread, which increase the rate of its disintegration, to cutting of the protection plies which then contribute less effectively or not at all towards the resistance to separation between the working plies, and also to cuts in the working plies, with the possibility of spreading and oxidation of the metallic elements in the said plies by humidity and soil particles,
  (b) to puncturing of the crown as a whole, while the carcass reinforcement itself may also be punctured depending on the nature and shape of the aggressive object.

The resistance of the protection plies to cutting and the resistance of the crown to puncturing must be improved.

From U.S. Pat. No. 3,589,125 it is known, in the case of the tread of an aircraft tire comprising a carcass reinforcement formed of several plies of textile elements crossed from one ply to the next, to arrange from one edge of the tread to the other edge on the one hand plies of oblique textile cords flush with the bottoms of circumferential grooves of the tread in order to oppose the effects of centrifugal force on the said tread, and on the other hand two plies of hyper-elastic metallic cables with a relative elongation between 15 and 40%, the said cables being crossed from one ply to the next and the said plies being embedded between the bottom of the tread grooves and the carcass reinforcement of the said tire.

To avoid the initiation and minimize the spreading towards the tread reinforcement of breaks at the bottom of the transverse grooves of an off-the-road tire, French Patent No. 2,388,685 (corresponding to U.S. Pat. No. 4,194,548) proposes the arrangement, in the ungrooved portion between the bottoms of grooves and the crown reinforcement, of at least one ply of cables with low extensibility (steel cables with a relative elongation smaller than 0.5% under a tensile force equal to 10% of the breaking load), the inclination of the said cables relative to the circumferential direction being less than 300 and preferably between 12 and 24°, and the radial distance between the groove bottoms and the said ply of cables being less than but close to one-third of the radial distance between the groove bottoms and the crown ply nearest the tread. Such a structure does not protect against cuts and their spreading, and has a very adverse effect on the resistance of the tire's crown to the shocks imposed by the rapid aggression of large obstacles.

SUMMARY OF THE INVENTION

With a view to improving the resistances of a crown of an off-the-road tire simultaneously to the three types of aggression by external objects, namely the resistance to cuts, resistance to punctures and the resistance to shocks, the tire according to the present invention, which comprises a radial carcass reinforcement anchored in each bead to an annular bead reinforcing element and radially outwards of the carcass reinforcement a crown reinforcement composed of at least two working crown plies of inextensible metallic cables crossed from one ply to the next, the said plies having widths at least equal to 50% of the width L of the tread and, radially outwards of the working plies, two protection crown plies of so-termed elastic metallic cables crossed from one ply to the next, the tread having in its ungrooved portion of thickness D at least one armature of reinforcement elements, is characterized in that the said armature is composed of at least two layers of textile monofilaments parallel to one another within each layer, the axial widths of the said two layers being at least equal to the width of the working ply that is least wide.

It is particularly advantageous for the layers to be formed of monofilaments crossed from one layer to the next and forming angles between 50 and 60° relative to the circumferential direction, because these only slightly modify the rigidities of the combination of plies between the carcass reinforcement and the ground.

The textile material is preferably a polyamide, whether aliphatic or aromatic. Per unit of axial width and per unit of circumferential length of the ungrooved portion of he tread, the volume occupied by the elements of the reinforcement layers is at most equal to 20% of the total volume, the volume of rubber mixture then being at least equal to 80% of the said total volume: the above filling characteristics enable a very good compromise to be obtained between the resistance to cuts and the shock resistance of the additional tread reinforcement.

BRIEF DESCRIPTION OF THE DRAWINGS

The characteristics of the present invention will be better understood with the aid of a description of an embodiment, presented in a non-limiting way and illustrated by the attached drawing in which the single

DESCRIPTION OF A PREFERRED EMBODIMENT

Figure 1:
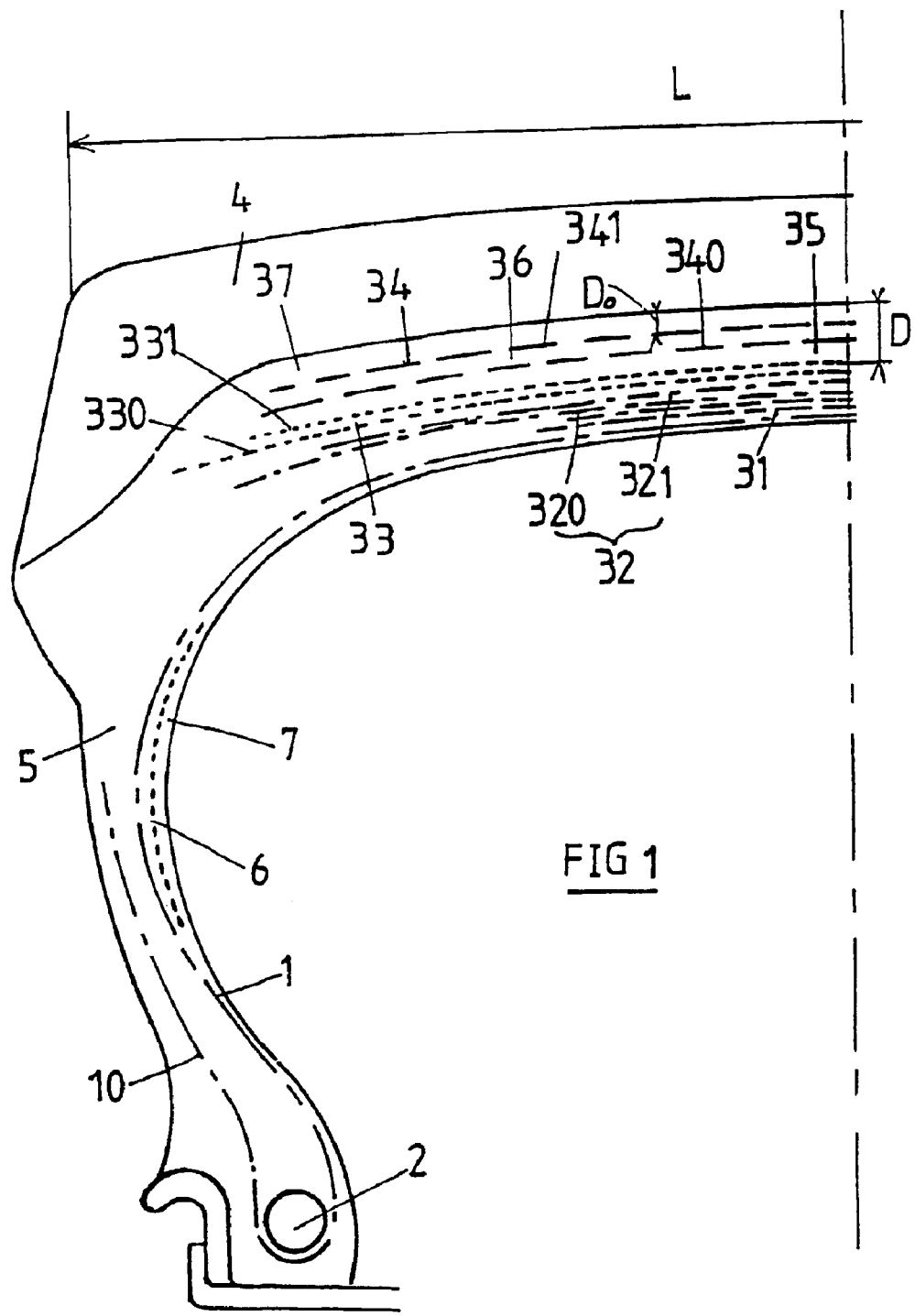
FIG. 1 is a schematic representation of a meridian sectional view of a tire according to the invention for heavy off-the-road vehicles.
Figure 2:
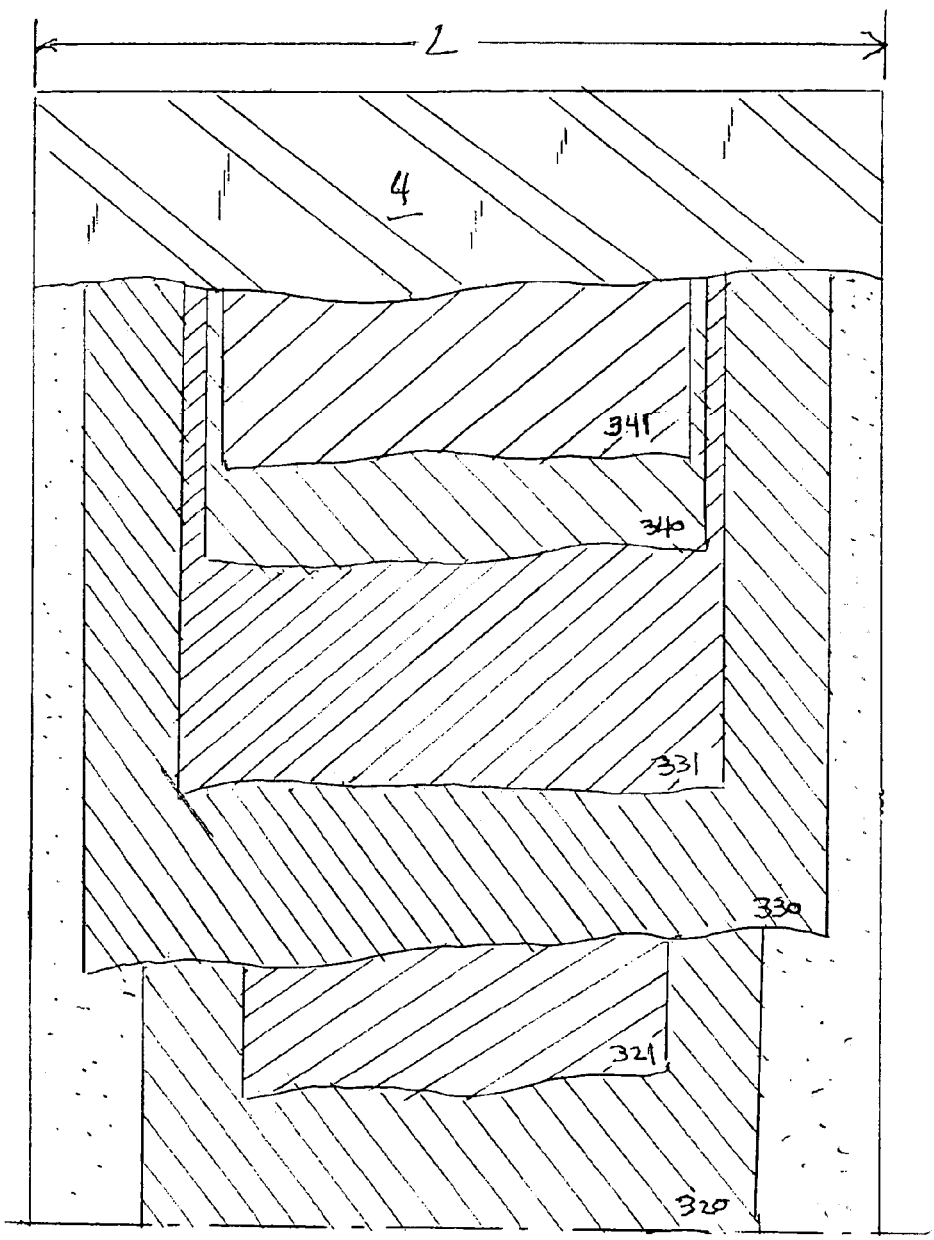
FIG. 2 is a plan view of a tire according to the invention, with parts thereof peeled away to show various layers of the tire.

The said tire, of size 18.00-33 XDT, comprises a carcass reinforcement consisting of a single ply 1 of radial, inextensible steel metallic cables, the said ply 1 being anchored in each bead, generally by being turned up around a bead wire 2 to form carcass reinforcement upturns 10, the reinforcement upturns 10, the ends of the said upturns being located essentially half-way up the sidewalls 5. Axially on the inside, the said carcass reinforcement is reinforced by a structure 6 of two plies of aliphatic polyamide cables crossed from one ply to the next, the said plies being positioned axially at the middle of a consistent thickness of rubber mixture 7 radially essentially in the middle of the sidewall 5. Between the said carcass reinforcement 1 and the tread 4 is arranged a crown reinforcement 3, which comprises radially from inside outwards:

two plies 31 known as hooping plies formed of inextensible metallic cables that make an angle of 8° with the circumferential direction, and whose axial widths are equal to 28% and 22% of the axial width L of the tread;

an armature 32 known as the working armature and consisting of at least two working plies 320 and 321 of inextensible metallic cables, parallel to one another within each ply and crossed from one ply 320 to the next 321, which make with the circumferential direction angles respectively equal to 34° and 20°, the said two plies 320 and 321 having respective axial widths equal to 75% and 55% of the width L of the tread 4;

radially outside the working armature 32 there is a protection armature 33 composed in the case described of two protection plies 330 and 331, the said two plies being formed of so-termed elastic cables crossed from one ply 330 to the next 331 and making with the circumferential direction angles equal to 28°, the axial widths of the said two protection plies 330 and 331 being such that the wider ply 330 has an axial width (89% the width L) greater than the axial width of the wider working ply 320, and the narrower ply 331 (68% of the width L) has an axial width greater than the axial width of the narrower working ply 321;

in the ungrooved portion of the tread 4, of thickness D measured in the equatorial plane but clearly variable depending on the axial measurement point, is arranged an additional tread reinforcement 34, the said reinforcement consisting of two plies or layers 340 and 341 of aliphatic polyamide monofilaments parallel to one another within each ply and crossed from one ply to the next, which make angles equal to 55° relative to the circumferential direction, the said two plies 340 and 341 having axial widths (63% and 58% of the width L) greater than the width of the narrower working ply 321. The said two plies 340 and 341 radially divide the layer of rubber mixture forming the ungrooved portion of the tread into three sub-layers, the layer 35 between the radially lower ply 340 of the armature 34 and the outermost protection ply 331, the layer 36 separating the two plies 340 and 341, and the layer 37 between the bottom of the grooves and the radially upper ply 341 of the armature 34, the said three layers 35, 36, 37 having a thickness $D_0$ measured in the equatorial plane which is essentially constant over the full axial width and is equal to D/3.

The characteristics in accordance with which the said monofilaments are of polyamide and are radially separated from the protection plies 330 and 331 minimize the spreading of cuts towards the protection armature, allowing it to fulfill its dual role of protection and resisting separation between the working plies, and also improving resistance to puncture. The characteristics in accordance with which the said monofilaments are orientated at an angle equal or close to 55° and the armature 34 conforms to a given filling structure (volume occupied by the reinforcement elements equal to 15% of the total volume in the case described) avoid excessive flexural rigidity of the crown as a whole and have no adverse effect on shock resistance, on the contrary improving it.

The results obtained are particularly convincing in relation to resistance to cuts; for the same number of rolling hours over rocky ground with repeated passage though salty water, the number of cuts observed in the radially outmost ply 341 is large but the protection plies 331 and 330 are intact, whereas said protection plies in the control tire (which has no reinforced grooved portion of tread) show numerous cuts with infiltration of humidity and incipient oxidation of the elastic cables of the plies.

What is claimed is:

1. Tire for heavy off-the-road vehicles comprising a radial carcass reinforcement anchored in each bead to an annular bead reinforcement element, and radially outwards of the carcass reinforcement a crown reinforcement comprising at least two working crown plies of inextensible metallic cables crossed from one ply to the next, the plies having respective widths at least equal to 50% of the width L of the tread and, radially outwards of the working plies, two protection crown plies of elastic metallic cables crossed from one ply to the next, the tread comprising an ungrooved portion of thickness D in which at least one armature of reinforcement elements is disposed, wherein the armature comprises at least two layers of textile monofilaments parallel to one another in each layer, the axial widths of the two layers being at least equal to the width of a narrower one of the working plies.

2. Tire according to claim 1, wherein the textile monofilaments are crossed from one layer to the next and make angles between 50° and 60° relative to the circumferential direction.

3. Tire according to claim 1, wherein the textile material is a polyamide.

4. Tire according to claim 1, wherein the volume occupied by the elements of the reinforcement layers, per unit of axial width and per unit of circumferential length of the ungrooved portion of the tread, is at most equal to 20% of the total volume, of rubber mixture therefore being at least equal to 80% of the said total volume.

* * * * *